United States Patent
Zhou

[11] Patent Number: 5,494,391
[45] Date of Patent: Feb. 27, 1996

[54] TIRE REPAIR SCREW WITH SEALING MATERIAL

[76] Inventor: Peng W. Zhou, 14802 Millicent Ct., Centreville, Va. 22020

[21] Appl. No.: 312,227

[22] Filed: Sep. 26, 1994

[51] Int. Cl.⁶ ............................ F16B 33/00; F16B 43/02
[52] U.S. Cl. ............................ 411/369; 411/82; 411/542; 411/915
[58] Field of Search ................................. 411/368, 369, 411/542, 544, 915, 82, 258, 930

[56] References Cited

U.S. PATENT DOCUMENTS

| | | | |
|---|---|---|---|
| 951,437 | 3/1910 | Gehrke | 411/915 X |
| 2,688,497 | 9/1954 | Brisack | 411/369 X |
| 3,627,334 | 12/1971 | Reddy | 411/542 X |
| 4,875,818 | 10/1989 | Reinwall | 411/542 X |
| 4,987,714 | 1/1991 | Lemke | 411/369 X |

FOREIGN PATENT DOCUMENTS 627242  12/1981  Switzerland ........................... 411/369

Primary Examiner—Neill R. Wilson
Attorney, Agent, or Firm—Jones, Tullar & Cooper

[57] ABSTRACT

A very simple and economic method and closure for quickly repairing a puncture in a vehicle tire utilizes a screw having a concave slot beneath its head. A sealing material such as an adhesive rubber is placed in the slot and is used to seal the hole when the sealing screw is threaded into the hole. The design provides easy, quick, efficient and very low cost repair for a puncture in a tire, not only for temporary repair but for long term repairs. The design is simple and includes only two parts: a screw having a spiral convex, or thread which affixes the screw in the tire and which further includes a concave slot under the screw head, and a sealing material such as adhesive or sticky rubber which is secured in the slot. The screw body is fixed in the tire hole and the head presses the sealing material onto the hole.

1 Claim, 1 Drawing Sheet

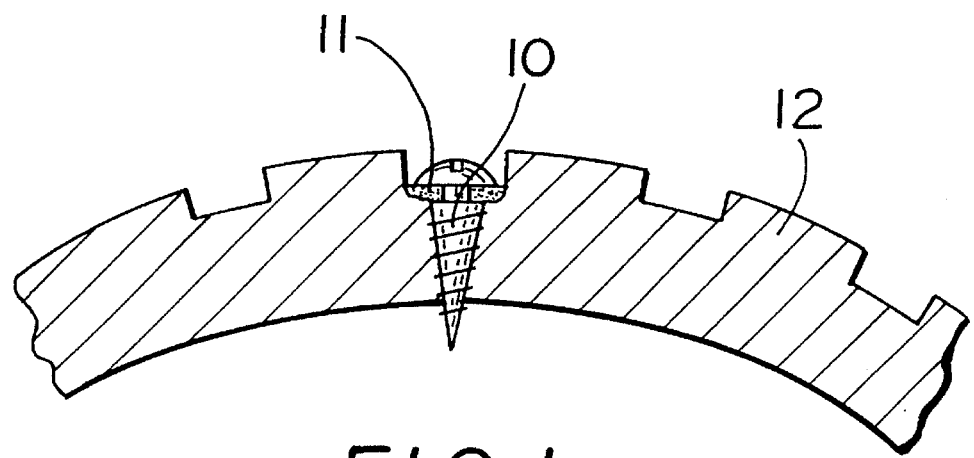
FIG. 1
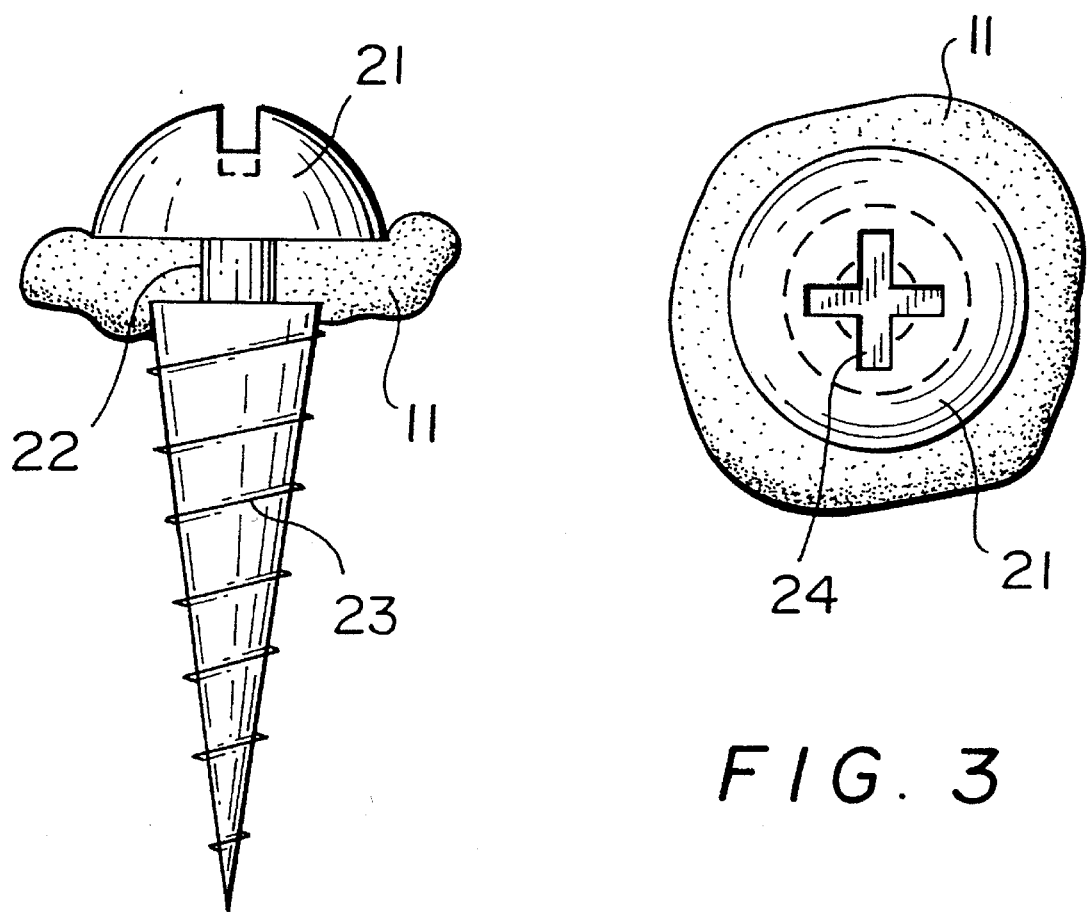
FIG. 2
FIG. 3

TIRE REPAIR SCREW WITH SEALING MATERIAL

BACKGROUND OF THE INVENTION

The present invention is directed to a method and device for repairing a hole in a vehicle tire. In the past, many methods and tools have been designed and used in attempts to repair automobile tires, but not too many of these tools remain on the market. Some of these were not easy to use, many of them were too complex and not economic. Additionally, many people cannot use these tools or plugs to repair holes in tires, especially when traveling. The present invention provides an easy, quick, economic and efficient method to repair a tire hole without the need of any special skills and without removing the tire from the vehicle.

SUMMARY OF THE INVENTION

It is, therefore, an object of the present invention to provide a highly efficient method for repairing punctures or holes in a tire.

Another object of the present invention is to provide a very low cost device for repairing punctures in tires.

A more important object of the invention is to provide a very simple method for quickly repairing holes or punctures tires without the need for any special repair skills.

A still further object of the invention is to provide an easy-to-use method for repairing punctures in tires which requires only one simple tool; namely, a screwdriver.

Generally speaking, the present invention provides a very convenient, economic method for repairing holes in vehicle tires, which method can be carried out by individuals without any previous experience in performing the method. The method can be performed even when traveling, without taking the tire off the car. All that is required is that the operator press a sealing screw into the puncture and put the sealing material around and inside a slot formed under the head of the sealing screw. Then a screwdriver is used to drive the sealing screw into the hole and to tighten it. The theory of the invention is based on the following:

As a physical theory, force F equals the pressure P times the area S; that is, $F=P*S$. When a sealing screw is placed in a hole in a tire, the leaking area between the screw and the wall of the hole which is formed by the rubber of the tire is very small. Even if the pressure inside the tire is large, because of the very small area S, the resulting force is very small. A small piece of sealing material such as an adhesive rubber placed around the top of the leaking area is enough to seal it. The sealing screw includes a head which will press the sealing material into the hole, with the body of the sealing screw having a spiral thread which fixes the screw inside the tire hole so that at high speed the head of the screw can still press the sealing material around the hole without any leaking.

The tire is made of rubber. Accordingly, it is very easy to use a screwdriver to drive the sealing screw, which has a tapered body and a convex spiral, with the sealing material into the hole. The hole can be easily expanded so that a limited number of sizes of sealing screws are sufficient to cover a number of different sizes of holes.

BRIEF DESCRIPTION OF THE DRAWINGS

The foregoing, and additional objects, features, and advantages of the present invention will be apparent from the following detailed description of a preferred embodiment thereof, taken in conjunction with the accompanying drawings, in which:

FIG. 1 is a partial cross-sectional view of a typical vehicle tire which has been repaired by the sealing screw and sealing material of the invention;

FIG. 2 is an enlarged side view of the sealing screw with sealing material of FIG. 1; and FIG. 3 is a top view of the device of FIG. 2

DESCRIPTION OF PREFERRED EMBODIMENT

Referring now to the drawings, there is illustrated in FIG. 1 a sealing screw 10 with a sealing material 11 located in a hole in a tire 12 to repair the tire. The sealing material 11 is a sticky material such as adhesive rubber. As illustrated, the body portion of the screw is located inside the hole in the tire 12, with the head of the screw pressing the sealing material around and into the top part of the hole.

In FIG. 2, the sealing screw head 21 forms a concave slot 22 where it joins the body portion of the screw. The slot 22 holds the sealing material 11 beneath the screw head. The body of the screw is tapered from the slot 22 downwardly to the tail portion and includes a convex spiral, or thread 23. The thread makes it easy to drive the sealing screw into the hole using a screwdriver.

FIG. 3, which is a top view of the sealing screw, shows the slot 24 which is engaged by a screwdriver to drive the screw into the hole in the tire.

I claim:

1. A screw-type closure for repairing a puncture in a vehicle tire, comprising:

a tapered body portion having an upper end having a first diameter and a tail end, the body portion having a conical surface tapering inwardly from the upper end to the lower end;

a convex spiral thread on the conical surface of said body portion, the convex thread shaped to cut into a vehicle tire when said closure is threaded into a puncture in the tire;

an enlarged head portion at the upper end of said body portion, said head portion having an upper surface and a lower surface, and having a larger diameter than said first diameter;

a driving slot in said upper surface of said head portion for inserting said closure in a tire puncture;

a sealing slot in the upper end of said body portion adjacent said lower surface of said head;

an adhesive flexible rubber sealing material in said sealing slot and extending outwardly from said body portion in contact with said lower surface of said head, said adhesive material being driven into sealing contact with a tire surface surrounding a puncture upon insertion of said screw into the puncture.

* * * * *